(12) United States Patent
Kasamatsu

(10) Patent No.: US 10,013,043 B2
(45) Date of Patent: Jul. 3, 2018

(54) FUNCTION EXECUTION APPARATUS, AND METHOD AND COMPUTER-READABLE MEDIUM FOR CUSTOMIZATION OF STANDBY SCREEN BASED ON FREQUENCY IN USE

(71) Applicant: BROTHER KOGYO KABUSHIKI KAISHA, Nagoya, Aichi (JP)

(72) Inventor: Daisuke Kasamatsu, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 27 days.

(21) Appl. No.: 14/725,445

(22) Filed: May 29, 2015

(65) Prior Publication Data
US 2015/0348499 A1 Dec. 3, 2015

(30) Foreign Application Priority Data
May 30, 2014 (JP) .................................. 2014-112851

(51) Int. Cl.
*G06F 1/32* (2006.01)
*H04N 1/00* (2006.01)
(Continued)

(52) U.S. Cl.
CPC .......... *G06F 1/3234* (2013.01); *G06F 3/0482* (2013.01); *G09G 5/00* (2013.01);
(Continued)

(58) Field of Classification Search
None
See application file for complete search history.

(56) References Cited

U.S. PATENT DOCUMENTS

2007/0247643 A1 10/2007 Nakamura et al.
2009/0046057 A1* 2/2009 Umezawa ........... G06F 3/04886
345/156
(Continued)

FOREIGN PATENT DOCUMENTS

JP 2000069212 A 3/2000
JP 2005-117478 A 4/2005
(Continued)

OTHER PUBLICATIONS

Notification of Reason for Rejection dated Feb. 27, 2018 received from the Japanese Patent Office in related application JP 2014-112851, 5 pages.

*Primary Examiner* — David D Davis
(74) *Attorney, Agent, or Firm* — Scully, Scott, Murphy & Presser, P.C.

(57) ABSTRACT

A function execution apparatus including an input unit and a display unit configured to display a standby screen for displaying function images arranged thereon. The function images represent a plurality of functions executable by the function execution apparatus. The function execution apparatus further includes a controller configured to execute an inquiry process to make an inquiry about frequency in use of each individual function of the plurality of functions, receive, via the input unit, usage frequency information about the frequency in use of each individual function of the plurality of functions, set the standby screen to a first screen configured to display thereon the function images arranged based on the received usage frequency information, and in response to setting the standby screen to the first screen, control the display unit to display the first screen as the standby screen.

16 Claims, 10 Drawing Sheets

(51) Int. Cl.
*G09G 5/00* (2006.01)
*G06F 3/0482* (2013.01)

(52) U.S. Cl.
CPC ..... *H04N 1/0035* (2013.01); *G09G 2330/022* (2013.01); *G09G 2330/026* (2013.01); *G09G 2354/00* (2013.01)

(56) References Cited

U.S. PATENT DOCUMENTS

| | | | | |
|---|---|---|---|---|
| 2009/0064002 A1* | 3/2009 | Katsumata | ........... | G03G 15/502 715/762 |
| 2011/0219302 A1* | 9/2011 | Kondo | ................. | G06F 3/0416 715/702 |
| 2014/0082514 A1* | 3/2014 | Sivaraman | ........... | G06F 3/0219 715/745 |
| 2015/0154302 A1* | 6/2015 | Chatani | ................ | G06F 3/0486 715/745 |

FOREIGN PATENT DOCUMENTS

| | | | |
|---|---|---|---|
| JP | 2005197978 | A | 7/2005 |
| JP | 2007-074149 | A | 3/2007 |
| JP | 2007-287091 | A | 11/2007 |
| JP | 2012-034300 | A | 2/2012 |

* cited by examiner

<QUESTIONNAIRE SCREEN>

Q3. Do you frequently use the copy function?
- 81 — ☐ 1. Use the function frequently.
- 82 — ☐ 2. Use the function.
- 83 — ☐ 3. Not use the function so frequently.
- 84 — ☐ 4. Not use the function.
- 85 — ☐ 5. No idea.

- 88 — END
- 87 — RETURN
- 86 — OK

FIG. 5A

<DETAIL INQUIRY SCREEN>

Q3a. What is your main purpose of use of the copy function?
- 91 — ☐ 1. Work
- 92 — ☐ 2. Hobby
- 93 — ☐ 3. Others

- 98 — END
- 97 — RETURN
- 96 — OK

FIG. 5B

FUNCTION EXECUTION APPARATUS, AND METHOD AND COMPUTER-READABLE MEDIUM FOR CUSTOMIZATION OF STANDBY SCREEN BASED ON FREQUENCY IN USE

CROSS-REFERENCE TO RELATED APPLICATION

This application claims priority under 35 U.S.C. § 119 from Japanese Patent Application No. 2014-112851 filed on May 30, 2014. The entire subject matter of the application is incorporated herein by reference.

BACKGROUND

Technical Field

The following description relates to one or more aspects of a function execution apparatus configured to selectively execute a plurality of functions, and a method and a computer-readable medium for the apparatus.

Related Art

Function execution apparatuses have been prevalent that are configured to selectively execute a plurality of functions such as a scanning function, a copy function, and a facsimile function. In general, such a function execution apparatus displays a standby screen on a display unit while the apparatus is not executing any function. For instance, a general standby screen displays a plurality of icons (hereinafter, which may be referred to as function buttons) arranged thereon. The function buttons represent a plurality of available functions, respectively.

SUMMARY

However, because such a known standby screen is configured to always display the function buttons for available functions, the more the number of the available functions is, the more difficult it is to find a particular function button on the standby screen. In particular, when a display area of the display unit is too small to display all of the function buttons, it might be required to perform one or more operations such as scrolling the screen and switching the page in order to find the particular function button.

Therefore, the known standby screen is not such a user-friendly user interface for users who usually use only a part of the plurality of functions or who are not so familiar with how to operate the apparatus.

Aspects of the present disclosure are advantageous to provide one or more improved techniques, for a function execution apparatus, which make it possible to display a user-friendly standby screen on a display unit.

According to aspects of the present disclosure, a function execution apparatus is provided, which includes an input unit and a display unit configured to display a standby screen for displaying function images arranged thereon. The function images represent a plurality of functions executable by the function execution apparatus. The function execution apparatus further includes a controller configured to execute an inquiry process to make an inquiry about frequency in use of each individual function of the plurality of functions, receive, via the input unit, usage frequency information about the frequency in use of each individual function of the plurality of functions, set the standby screen to a first screen configured to display thereon the function images arranged based on the received usage frequency information, and in response to setting the standby screen to the first screen, control the display unit to display the first screen as the standby screen.

According to aspects of the present disclosure, further provided is a method adapted to be implemented on a processor coupled with an input unit and a display unit. The display unit is configured to display a standby screen for displaying function images arranged thereon. The function images represent a plurality of functions executable by the processor. The method includes executing an inquiry process to make an inquiry about frequency in use of each individual function of the plurality of functions, acquiring, via the input unit, usage frequency information about the frequency in use of each individual function of the plurality of functions, setting the standby screen to a first screen configured to display thereon the function images arranged based on the received usage frequency information, and in response to the standby screen being set to the first screen, displaying on the display unit the first screen as the standby screen.

According to aspects of the present disclosure, further provided is a non-transitory computer-readable medium storing computer-readable instructions that are executable by a processor coupled with an input unit and a display unit. The display unit is configured to display a standby screen for displaying function images arranged thereon. The function images represent a plurality of functions executable by the processor. The instructions are configured to, when executed by the processor, cause the processor to execute an inquiry process to make an inquiry about frequency in use of each individual function of the plurality of functions, receive, via the input unit, usage frequency information about the frequency in use of each individual function of the plurality of functions, set the standby screen to a first screen configured to display thereon the function images arranged based on the received usage frequency information, and in response to setting the standby screen to the first screen, control the display unit to display the first screen as the standby screen.

BRIEF DESCRIPTION OF THE ACCOMPANYING DRAWINGS

Figure 2:
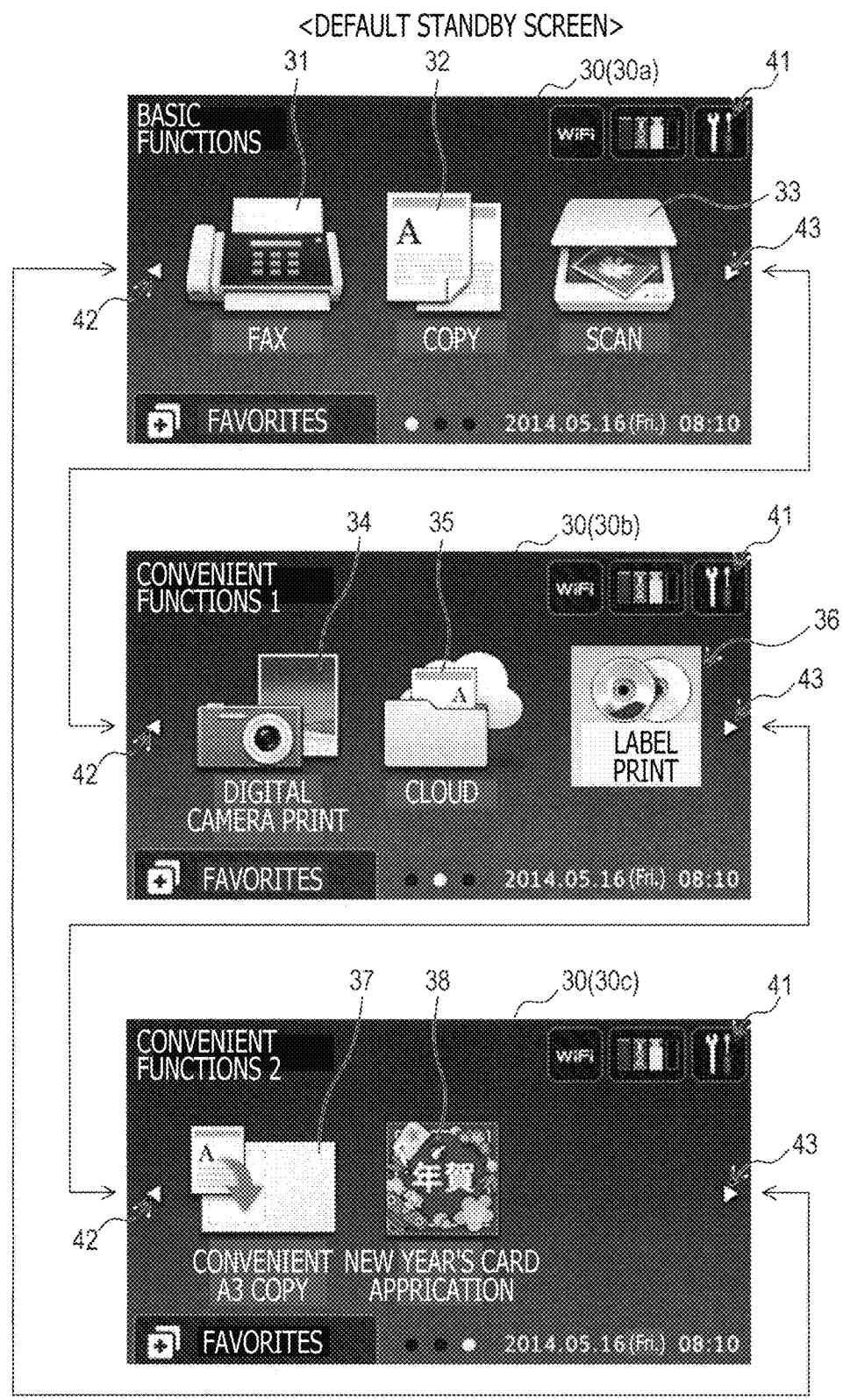

FIG. 2 exemplifies display states of a default standby screen in the illustrative embodiment according to one or more aspects of the present disclosure.

Figure 3:
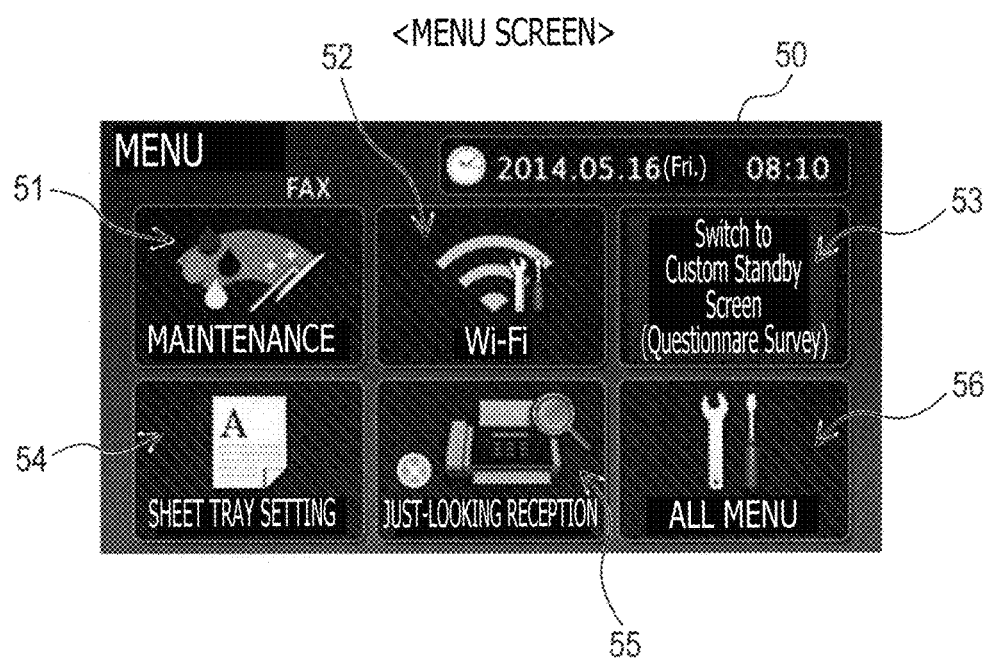

FIG. 3 exemplifies a menu screen that is displayed when a menu button is tapped on the default standby screen, in the illustrative embodiment according to one or more aspects of the present disclosure.

Figure 4A:
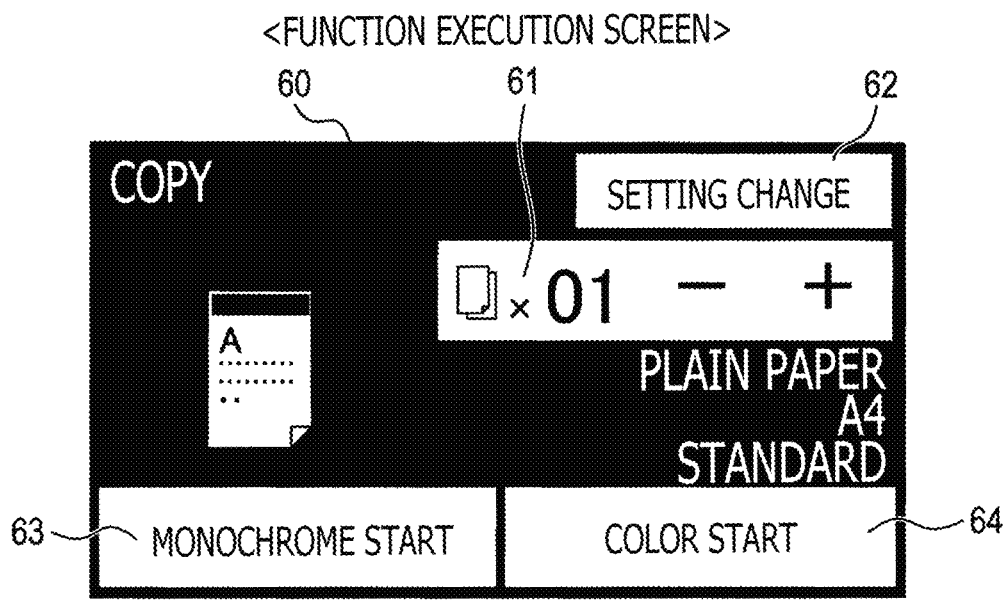

FIG. 4A exemplifies a function execution screen for a copy function in the illustrative embodiment according to one or more aspects of the present disclosure.

Figure 4B:
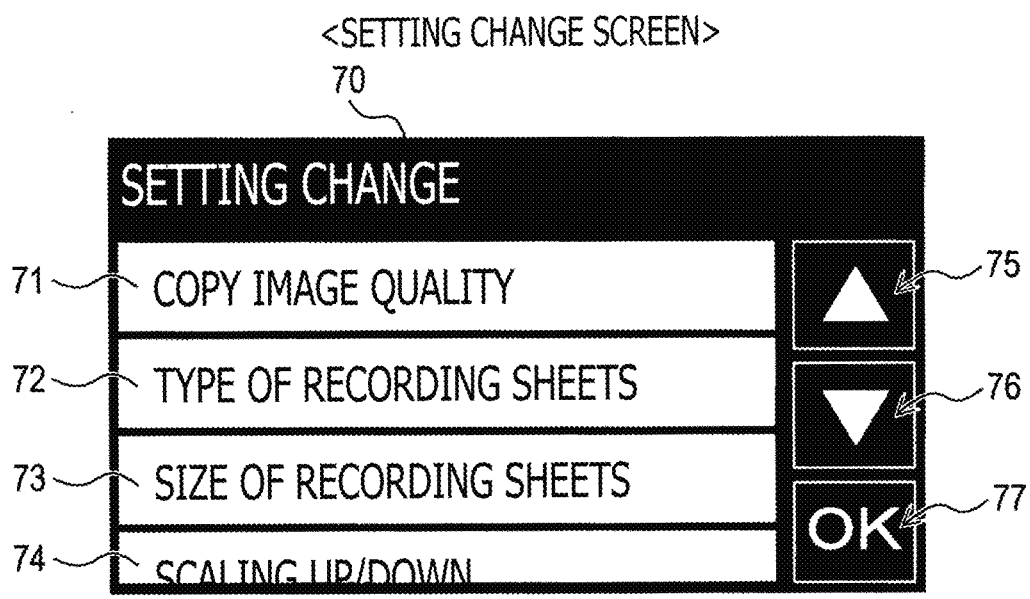

FIG. 4B exemplifies a setting change screen that is displayed when a setting change button is tapped on the function execution screen, in the illustrative embodiment according to one or more aspects of the present disclosure.

FIG. 5A exemplifies a questionnaire screen for the copy function in the illustrative embodiment according to one or more aspects of the present disclosure.

FIG. 5B exemplifies a detail inquiry screen in the illustrative embodiment according to one or more aspects of the present disclosure.

Figure 6:
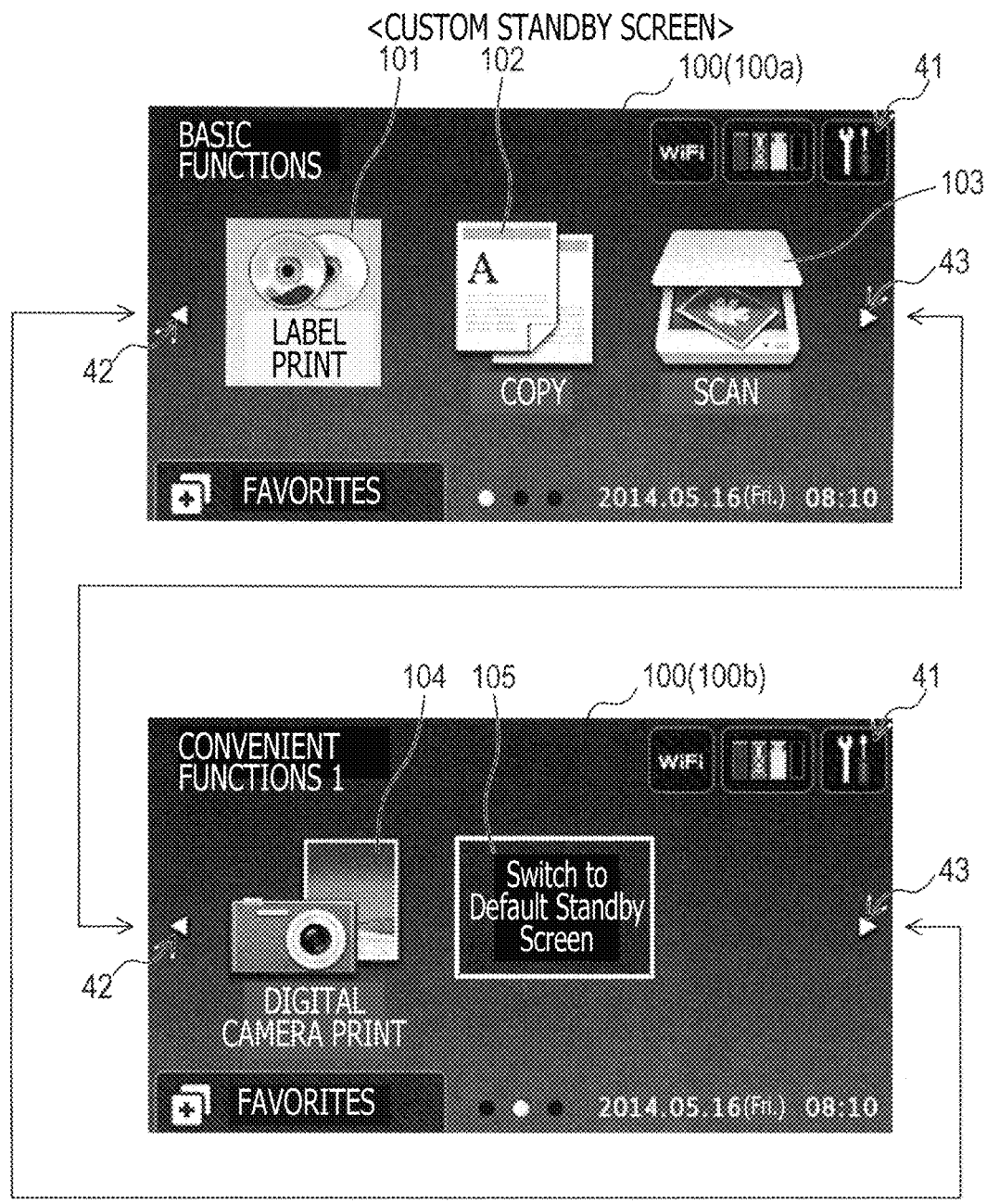

FIG. 6 exemplifies a custom standby screen in the illustrative embodiment according to one or more aspects of the present disclosure.

Figure 7A:
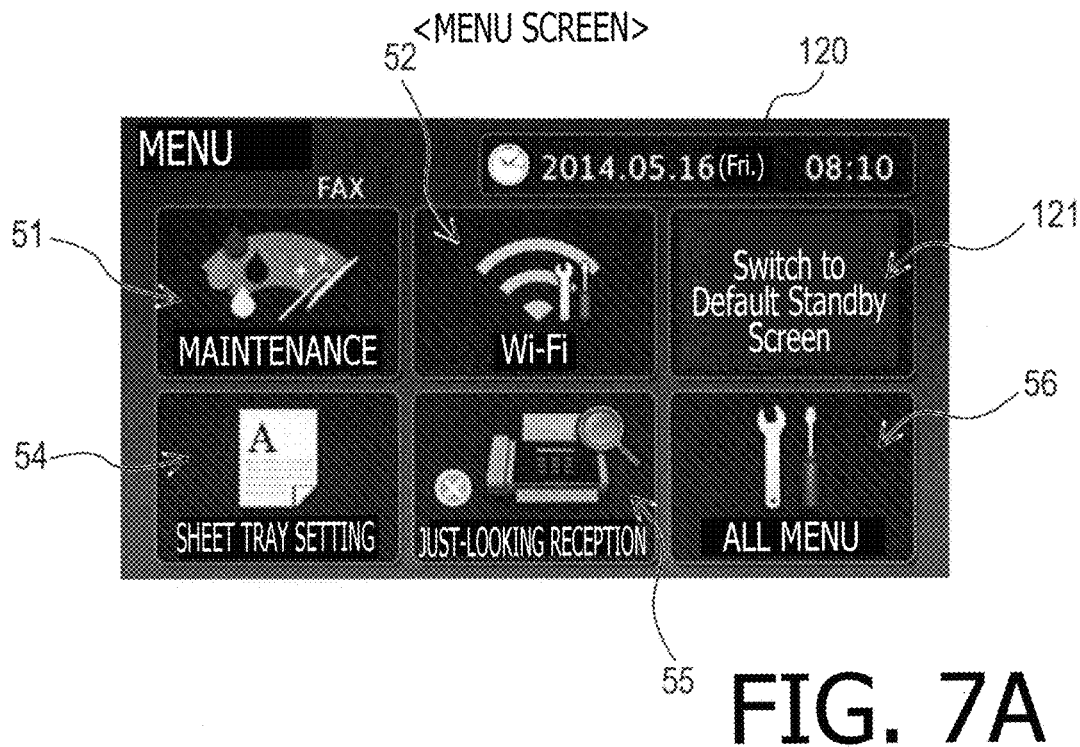
Figure 7B:
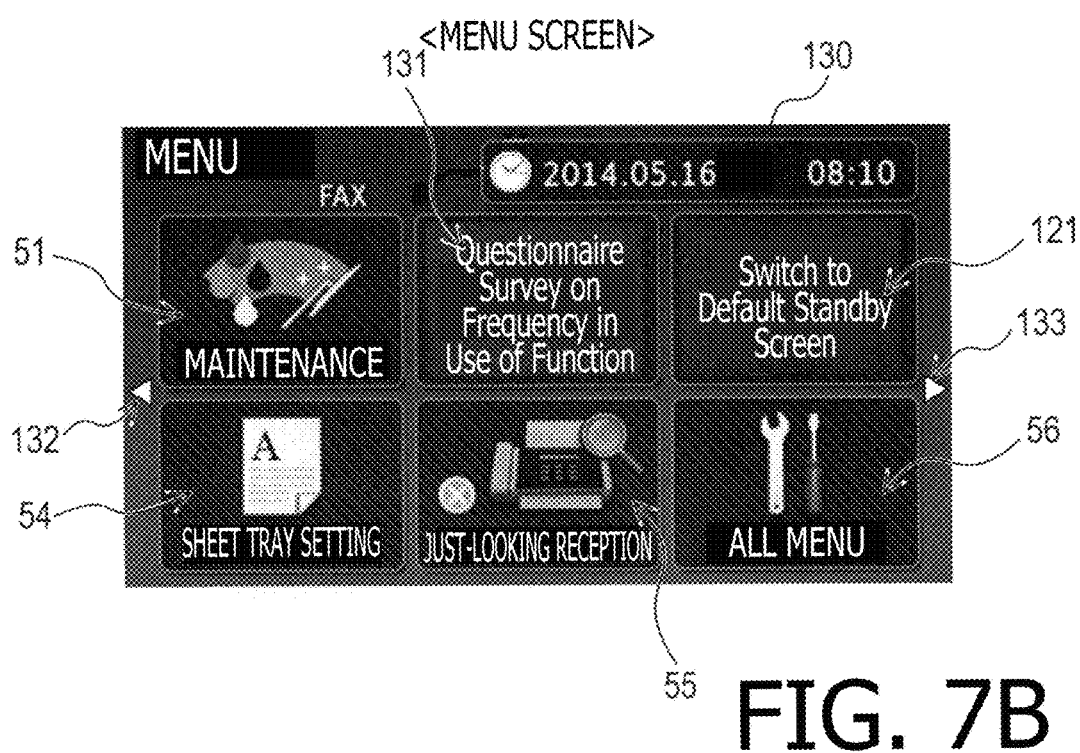

FIGS. 7A and 7B exemplify menu screens that are displayed when the menu button is tapped on the custom standby screen, in the illustrative embodiment according to one or more aspects of the present disclosure.

Figure 8:
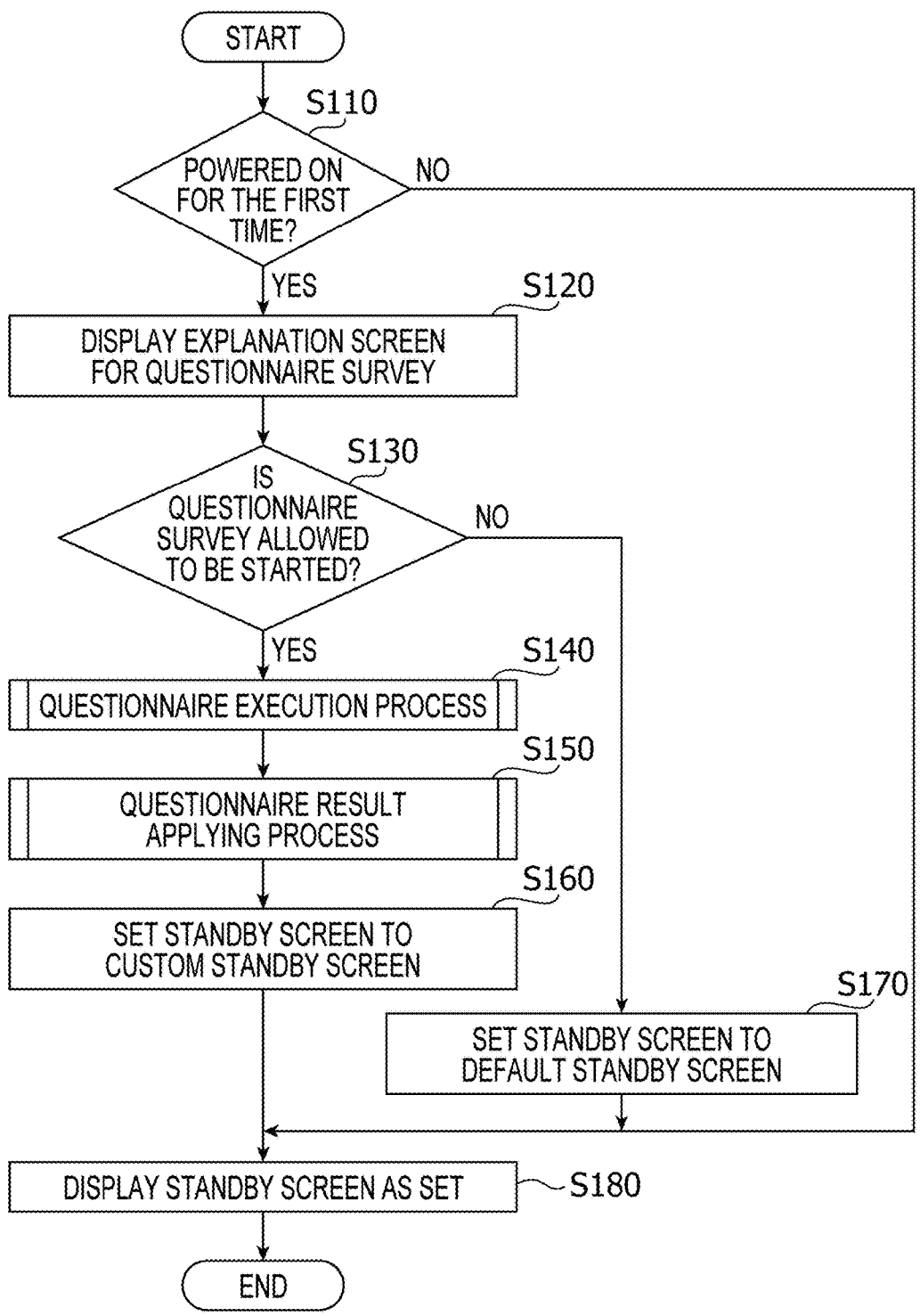

FIG. 8 is a flowchart showing a procedure of a questionnaire process in the illustrative embodiment according to one or more aspects of the present disclosure.

Figure 9:
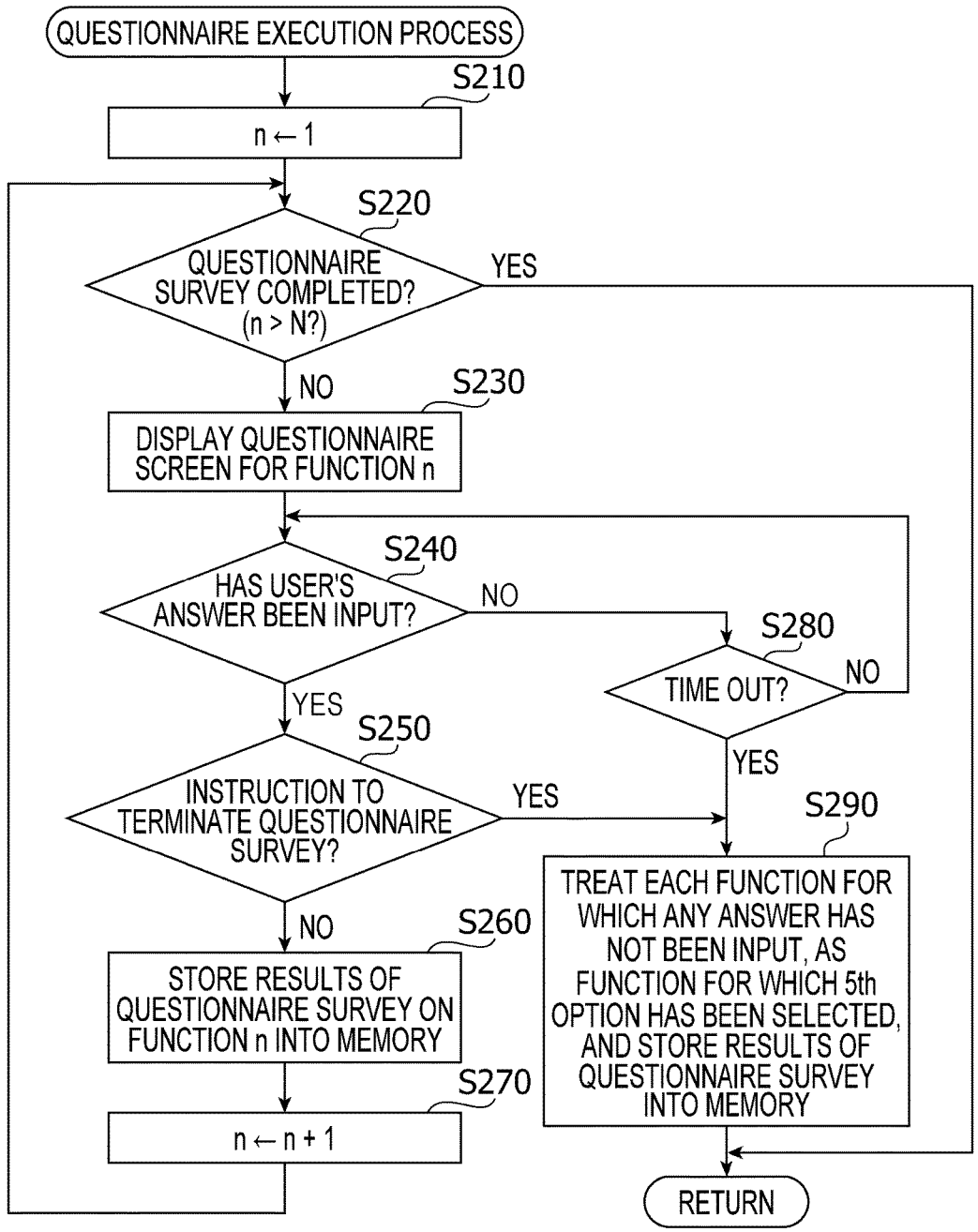

FIG. 9 is a flowchart showing a detailed procedure of a questionnaire execution process that is a sub-process of the questionnaire process, in the illustrative embodiment according to one or more aspects of the present disclosure.

Figure 10:
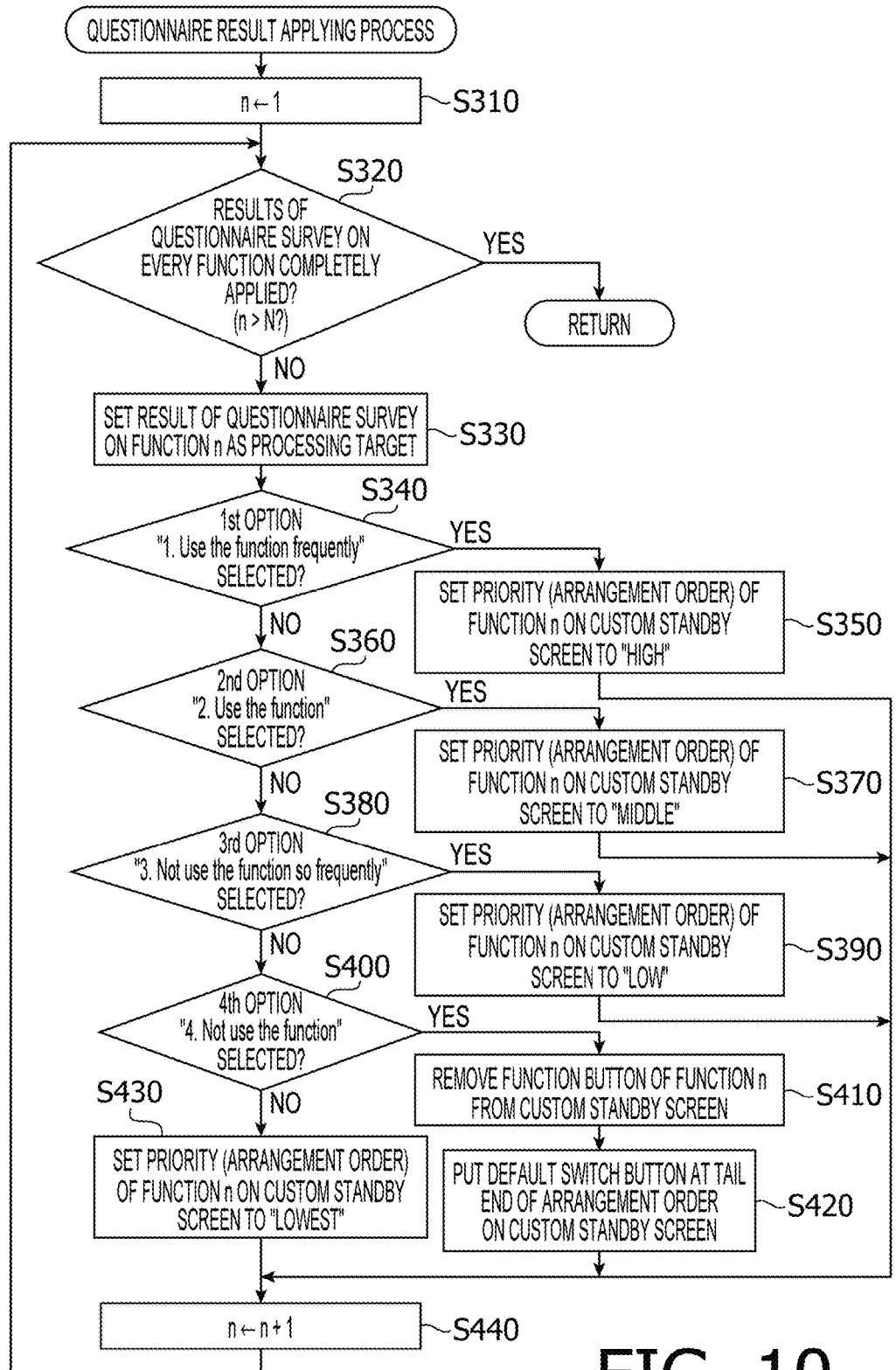

FIG. 10 is a flowchart showing a detailed procedure of a questionnaire result applying process that is a sub-process of the questionnaire process, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Configuration of MFP

Figure 1A:
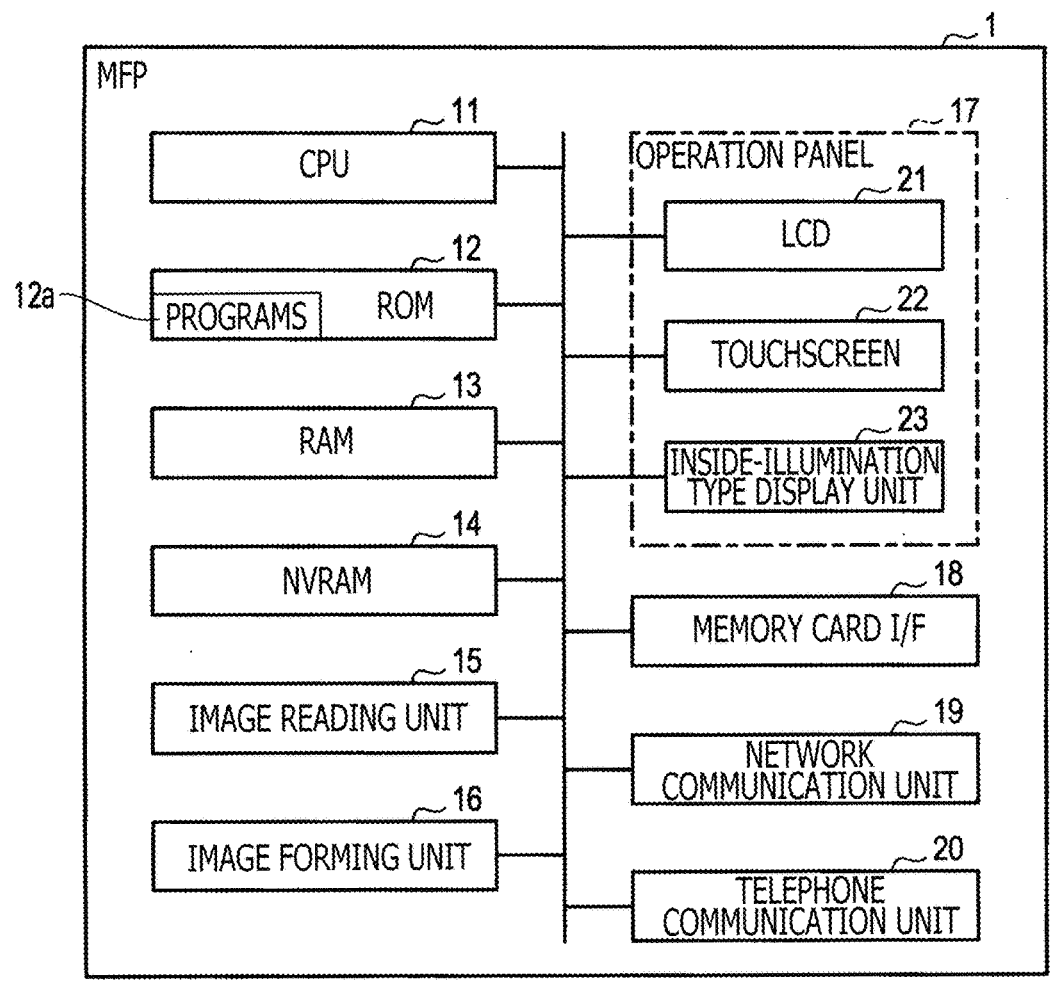
FIG. 1A is a block diagram schematically showing a configuration of a multi-function peripheral (hereinafter referred to as the "MFP") in an illustrative embodiment according to one or more aspects of the present disclosure.

As shown in FIG. 1A, a multi-function peripheral 1 (hereinafter referred to as the "MFP 1" in an abbreviated form) of an illustrative embodiment includes a CPU 11, a ROM 12, a RAM 13, a non-volatile random access memory 14 (hereinafter referred to as the "NVRAM 14"), an image reading unit 15, an image forming unit 16, an operation panel unit 17, a memory card interface 18 (hereinafter, which may be referred to as the memory card I/F 18), a network communication unit 19, and a telephone communication unit 20.

The ROM 12 is configured to store various programs 12a such as below-mentioned control programs, function programs, and questionnaire programs. It is noted that the programs 12a may be stored in at least one of the ROM 12 and the NVRAM 14. The CPU 11 is configured to take control of each element included in the MFP 1 in accordance with the control programs of the programs 12a stored in the ROM 12. It is noted that the control programs may be stored in the NVRAM 14. The RAM 13 is used as a main memory for storing various kinds of information and image data. The NVRAM 14 is configured to store firmware, various setting values, programs, and various kinds of data.

The image reading unit 15 is configured to read an image of a document sheet by an image sensor and generate image data indicating the read image. The image forming unit 16 is configured to print an image on a sheet-like recording medium (e.g., a recording paper). The memory card I/F 18 is an interface into which various memory cards are attached. The memory card I/F 18 is configured to control operations of writing data into a memory card and reading data from the memory card. The network communication unit 19 includes a network interface card. The network communication unit 19 is configured to perform data communication with an external device by a particular communication protocol. The telephone communication unit 20 includes a modem. The telephone communication unit 20 is used for voice communication and facsimile communication via a telephone network (not shown).

Figure 1B:
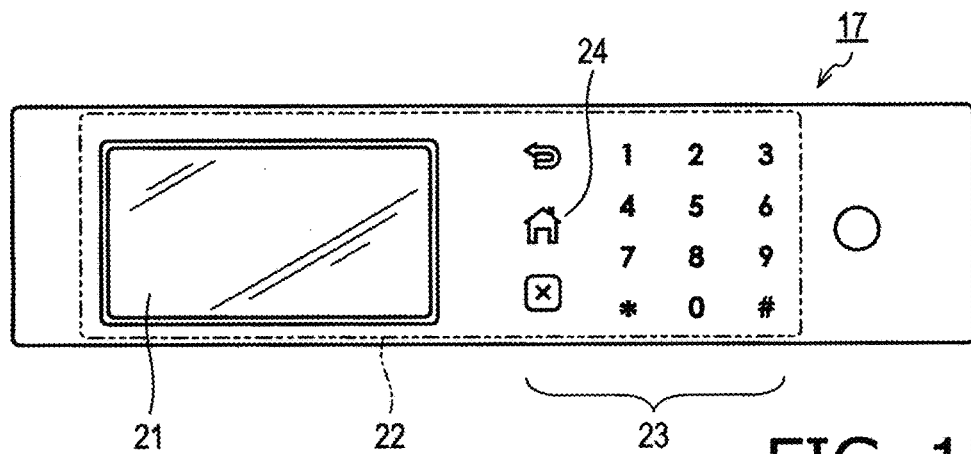
FIG. 1B is an external view of an operation panel of the MFP in the illustrative embodiment according to one or more aspects of the present disclosure.

The operation panel unit 17 includes a liquid crystal display 21 (hereinafter referred to as the "LCD 21" in an abbreviated form), a touchscreen 22, and an inside-illumination type display unit 23. The liquid crystal display 21, the touchscreen 22, and the inside-illumination type display unit 23 are disposed as shown in FIG. 1B. The LCD 21 is configured to display thereon various kinds of information such as the functions and an operational state of the MFP 1 and operational status.

The touchscreen 22 is a transparent-film-shaped input device configured to detect a touch (pressing) operation using an indication body such as a finger and a stylus. The touchscreen 22 is disposed on display surfaces of the LCD 21 and the inside-illumination type display unit 23 in an overlapped (integrated) manner. In the illustrative embodiment, at least tapping, swiping, and flicking may be cited as detectable touch operations on the touchscreen 22.

The inside-illumination type display unit 23 is configured to display images representing numeric keypads and operable buttons. As shown in FIG. 1B, there is a home key 24 as one of the operable buttons. When the home key 24 is pressed, a standby screen is displayed on the LCD 21.

The standby screen is a screen to be displayed when the MFP 1 is in a specific standby state where the MFP 1 is not operated. After the MFP 1 is booted, the MFP 1 is placed in the standby state where the standby screen is displayed on the LCD 21 until the MFP 1 accepts a user operation or external facsimile data. When an event to release the standby state occurs (e.g., when the MFP 1 accepts a user operation or external facsimile data), the standby state is released, and the screen on the LCD 21 is switched to a screen corresponding to the event to release the standby state. Thereafter, when a particular standby condition is satisfied (e.g., when the MFP 1 does not accept any user operation for a predetermined period of time or completes an operation required to be performed in response to occurrence of the event to release the standby state), the screen on the LCD 21 returns to the standby screen. Further, even when a screen different from the standby screen is displayed, the screen on the LCD 21 may be returned to the standby screen in response to the home key 24 being pressed.

In the illustrative embodiment, available types of the standby screen are roughly classified into a default standby screen 30 (see FIG. 2) and a custom standby screen 100 (see FIG. 6). An explanation will be provided later about which standby screen is displayed in what kind of situation.

The MFP 1 has major functions such as a facsimile function, a copy function, a scanning function, a digital camera print function, a cloud function, and a label print function. Each of these functions is implemented by the CPU 11 executing the function programs of the programs 12a stored in the ROM 12. It is noted that the function programs may be stored in at least one of the ROM 12 and the NVRAM 14.

The facsimile function is a function to transmit and receive facsimile data. The facsimile function makes it possible to externally receive facsimile data via the telephone communication unit 20, and to cause the LCD 21 to display contents of the received data or cause the image forming unit 16 to print the contents of the received data. In addition, the facsimile function makes it possible to cause the image reading unit 15 to read an image of a document sheet, and to transmit the read image to the outside as facsimile data via the telephone communication unit 20.

The copy function is a function to cause the image reading unit 15 to read an image of a document sheet and cause the image forming unit 16 to print out the read image. The scanning function is a function to cause the image reading unit 15 to read an image of a document sheet, and to output image data of the read image in various types of output methods. For example, the output methods of the scanning function may include a method to store the image data into a memory card attached to the memory card I/F 18, and a method to transmit the image data to the outside via the network communication unit 19.

The digital camera print function is a function to, when a memory card storing an image taken by a digital camera is attached into the memory card I/F 18, cause the image forming unit 16 to print the image stored in the memory card.

The cloud function is a function to upload an image read by the image reading unit 15 to a web service configured to store photographs and documents uploaded thereto, and to download an already-uploaded image from the web service and cause the image forming unit 16 to print the downloaded image. Uploading and downloading of images and documents are performed mainly via the network communication unit 19.

The label print function is a function to cause the image forming unit 16 to print an particular image on a label surface of a disk-shaped storage medium such as a CD or a DVD.

(2) Default Standby Screen

The default standby screen, which is one of the standby screens available in the illustrative embodiment, will be described with reference to FIG. 2. In the illustrative embodiment, as will be described later, the MFP 1 is configured to customize the standby screen in accordance with user's entries. Specifically, the MFP 1 conducts a questionnaire survey to the user, and performs to customize the standby screen based on results of the questionnaire survey.

The default standby screen 30 is a standard standby screen that is not customized by the user. In contrast, the custom standby screen 100 (see FIG. 6) is a standby screen customized based on the results of the questionnaire survey to the user.

As shown in FIG. 2, on the default standby screen 30, a plurality of function buttons 31 to 38 corresponding to particular eight sorts of functions of the MFP 1 are displayed. The particular eight functions of the MFP 1 include the aforementioned six main functions. More specifically, the plurality of function buttons 31 to 38 are a facsimile button 31, a copy button 32, a scanning button 33, a digital camera print button 34, a cloud button 35, a label print button 36, an A3 copy button 37, and a New Year's card application button 38. The eight buttons 31 to 38 are arranged laterally from the left to the right in the aforementioned order (hereinafter referred to as the "standard arrangement order").

Nonetheless, in the illustrative embodiment, the maximum number of function buttons concurrently displayable on the LCD 21 is three. Therefore, when the standby screen begins to be displayed, a first default standby screen 30*a* (see an upper portion of FIG. 2) is displayed. On the first default standby screen 30*a*, the facsimile button 31, the copy button 32, and the scanning button 33 are displayed, which are the first to third ones of the function buttons 31 to 38 in the standard arrangement order, respectively.

On a right end portion of the default standby screen 30, a leftward scrolling button 43 for scrolling the screen leftward is displayed. On a left end portion of the default standby screen 30, a rightward scrolling button 42 for scrolling the screen rightward is displayed.

When the leftward scrolling button 43 is tapped on the first default standby screen 30*a*, the screen is scrolled leftward in the following manner. That is, the currently-displayed three function buttons are moved leftward and disappear from the screen, and next three function buttons newly appear onto the screen from the right. Thus, the screen is changed to a second default standby screen 30*b* shown in a middle portion of FIG. 2. On the second default standby screen 30*b*, the digital camera print button 34, the cloud button 35, and the label print button 36 are displayed, which are the fourth to sixth ones of the function buttons 31 to 38 in the standard arrangement order, respectively.

When the leftward scrolling button 43 is tapped in a state where the second default standby screen 30*b* is displayed, the screen is scrolled leftward in the following manner. That is, the currently-displayed three function buttons are moved leftward and disappear from the screen, and next three function buttons newly appear onto the screen from the right. Thus, the screen is changed to a third default standby screen 30*c* shown in a lower portion of FIG. 2. On the third default standby screen 30*c*, the A3 copy button 37 and the New Year's card application button 38 are displayed, which are the seventh and eighth ones of the function buttons 31 to 38 in the standard arrangement order, respectively.

When the leftward scrolling button 43 is tapped in a state where the third default standby screen 30*c* is displayed, the screen is changed to the first default standby screen 30*a*. Conversely, when the rightward scrolling button 42 is tapped in the state where the first default standby screen 30*a* is displayed, the screen is changed to the third default standby screen 30*c*. Further, when the rightward scrolling button 42 is tapped in the state where the second default standby screen 30*b* is displayed, the screen is changed to the first default standby screen 30*a*. Furthermore, when the rightward scrolling button 42 is tapped in the state where the third default standby screen 30*c* is displayed, the screen is changed to the second default standby screen 30*b*.

On an upper right portion of the default standby screen 30, a menu button 41 is displayed. When the menu button 41 is tapped, the user is allowed to confirm and configure various kinds of settings for the MFP 1. Specifically, when the menu button 41 is tapped, a menu screen 50 is displayed as shown in FIG. 3. On the menu screen 50, a maintenance button 51, a Wi-Fi button 52 (Wi-Fi® is a trademark registered by Wi-Fi Alliance), a custom switch button 53, a tray setting button 54, a just-looking reception button 55, and an all-menu button 56 are displayed. When one of the buttons 51 to 56 displayed on the menu screen 50, the MFP 1 executes an operation corresponding to the tapped button. For instance, when the Wi-Fi button 52 is tapped, a wireless LAN setting screen for configuring various settings of wireless LAN is displayed. Further, for example, when the all-menu button 56 is tapped, a detail setting screen for configuring more detailed settings of the MFP 1 is displayed.

The custom switch button 53 displayed on the menu screen 50 is a button for switching settings for the standby screen from settings for the default standby screen 30 to settings for the custom standby screen 100. The standby screen is set to the default standby screen 30 at the time of product shipment. Then, after factory shipment, the standby screen is set to the custom standby screen 100 in response to implementation of the below-mentioned questionnaire survey.

As exemplified in FIG. 6, a menu button 41, a rightward scrolling button 42, and a leftward scrolling button 43 are displayed on the custom standby screen 100 as well. When the menu button 41 is tapped on the custom standby screen 100, a menu screen 120 is displayed as shown in FIG. 7A.

It is noted that hereinafter, the menu screen 50 displayed as exemplified in FIG. 3 when the menu button 41 is tapped on the default standby screen 30 may be referred to as the "menu screen 50 under default settings." Further, the menu screen 120 displayed as exemplified in FIG. 7A when the menu button 41 is tapped on the custom standby screen 100 may be referred to as the "menu screen 120 under custom settings." The menu screen 50 under default settings and the menu screen 120 under custom settings are different from each other in the following one point. That is, on the menu screen 120 under custom settings, a default switch button 121 is displayed in substantially the same position as a position where the custom switch button 53 is displayed on the menu screen 50 under default settings.

The menu screen 120 under custom settings is displayed when the menu button 41 is tapped in the state where the standby screen is set to the custom standby screen 100. Then, when the default switch button 121 is tapped on the menu screen 120 under custom settings, the settings for the standby screen are changed to those for the default standby screen 30. Further, the current display on the LCD 21 is changed from the menu screen 120 to the default standby screen 30. During a period of time when the standby screen is set to the default screen 30, the default standby screen 30 (more specifically, the first default standby screen 30a) is always displayed when the MFP 1 is in the standby state. Then, when the menu button 41 is tapped on the default standby screen 30, the currently-displayed screen (i.e., the default standby screen 30) is changed to the menu screen 50 under default settings as exemplified in FIG. 3.

When the custom switch button 53 is tapped on the menu screen 50 under default settings, the settings for the standby screen is changed to those for the custom standby screen 100. Further, the menu screen 50 displayed on the LCD 21 is switched to the custom standby screen 100. During a period of time when the standby screen is set to the custom standby screen 100, the custom standby screen 100 (more specifically, a first custom standby screen 100a) is always displayed when the MFP 1 is in the standby state.

When the custom switch button 53 is tapped on the menu screen 50 under default settings in a situation where the below-mentioned questionnaire survey has never been conducted, and the standby screen has never been set to the custom standby screen 100, the questionnaire survey is started.

When one of the function buttons 31 to 38 displayed on the default standby screen 30 is tapped, a function corresponding to the tapped function button is executed. For instance, when the copy button 32 is tapped, the current display (i.e., the default standby screen 30) on the LCD 21 is changed to a function execution screen 60. The function execution screen 60 is a screen, corresponding to the copy button 32, of various screens available at a hierarchical level (hereinafter referred to as the "first hierarchical level") that is one-level lower than a hierarchical level of the standby screen. On the function execution screen 60 for the copy function, as shown in FIG. 4A, a copy number setting button 61, a setting change button 62, a monochrome start button 63, and a color start button 64 are displayed. The copy number setting button 61 is a button for setting the number of copies. The setting change button 62 is a button for changing settings on the copy function. The monochrome start button 63 is a button for starting monochrome copy. The color start button 64 is a button for starting color copy.

When the setting change button 62 is tapped, the current display (i.e., the function execution screen 60) on the LCD 21 is changed to a setting change screen 70. The setting change screen 70 is a screen at a hierarchical level (hereinafter referred to as the "second hierarchical level") that is further one-level lower than the hierarchical level of the function execution screen 60. On the setting change screen 70 for the copy function, various setting buttons (such as an image quality setting button 71, a recording sheet type setting button 72, a recording sheet size setting button 73, and an scaling setting button 74), a downward scrolling button 75, an upward scrolling button 76, and an OK button 77 are displayed. When one of the scrolling buttons 75 and 76 is tapped, it is possible to scroll setting items shown on the setting change screen 70 in an intended one of the downward and upward directions. When one of the displayed setting buttons is tapped, the currently-displayed screen (i.e., the setting change screen 70) is changed to a screen for configuring a setting value for a setting item corresponding to the tapped setting button. For example, when the image quality setting button 71 is tapped, the currently-displayed screen is changed to a screen for setting an image quality level for copying. Thus, the user is allowed to change the image quality level for copying on the screen. When the OK button 77 is tapped, the current display on the LCD 21 is returned to the function execution screen 60.

A predetermined standard value is set as a default setting value for each setting item at the time of product shipment. Nonetheless, each default value may be changed to a custom value different from the standard value, based on results of the below-mentioned questionnaire survey.

Operations to be executed when each function button 31 to 38 is tapped on the default standby screen 30 are programmed as function execution information for each individual function. Further, the function execution information for each individual function is stored as coded instructions of the function programs in the ROM 12. It is noted that the function execution information may be stored in at least one of the ROM 12 and the NVRAM 14. Thus, when one of the function buttons 31 to 38 is tapped, a function corresponding to the tapped function button is executed based on the corresponding function execution information. For example, the function execution information for the copy function contains operations required for completing the requested copying, such as displaying the function execution screen 60 (see FIG. 4A) when the copy button 32 is tapped on the standby screen and displaying the setting change screen 70 (see FIG. 4B) when the setting change button 62 is tapped on the function execution screen 60. Contents on a function execution screen displayed when a function button is tapped vary from one function to another. Further, the number and sorts of screens that include the function execution screen and lower-hierarchical-level screens vary from one function to another.

(3) Questionnaire Survey

In the illustrative embodiment, when the MFP 1 is powered on and booted for the first time after being purchased, various sorts of initial processes are executed. One of the initial processes is an initial introduction purge. The initial introduction purge is cleaning of a printing head. The initial introduction purge is performed to supply ink throughout the printing head. The initial introduction purge takes a longer period of time than regular head cleaning.

During a period of time when the initial introduction purge is performed, the user is prompted to perform other initial processes in parallel with the initial introduction purge. The other initial processes include configuring various settings such as settings of trays and time setting. The user is allowed to configure necessary initial settings in accordance with a particular setting procedure. In the illustrative embodiment, as one of the initial processes, a questionnaire survey on frequency in use of (each function of) the MFP 1 is conducted to the user. Then, results of the questionnaire survey are reflected on the custom standby screen 100.

The questionnaire survey inquires the frequency in use of each individual one of the particular eight functions. Specifically, when the questionnaire survey is started, a questionnaire screen for each of the eight functions is sequentially displayed. For example, for the copy function, a questionnaire screen 80 as exemplified in FIG. 5A is displayed. The particular eight functions to which the questionnaire survey is directed correspond to the function buttons 31 to 38 on the default standby screen 30.

On the questionnaire screen 80 exemplified in FIG. 5A, a question "Q3. How frequently do you use the copy function?" and buttons 81 to 85 corresponding to five selectable options of answers to the question are displayed. Specifically, the displayed buttons corresponding to five selectable options of answers include a high frequency button 81, a middle frequency button 82, a low frequency button 83, a non-use button 84, and an unknown button 85. The high frequency button 81 is a button to be selected when the copy function is used with high frequency. The high frequency button 81 is displayed along with a text "1. Use the function frequently." The middle frequency button 82 is a button to be selected when the copy function is used with a middle degree of frequency. The middle frequency button 82 is displayed along with a text "2. Use the function." The low frequency button 83 is a button to be selected when the copy function is used with low frequency. The low frequency button 83 is displayed along with a text "3. Not use the function so frequently." The non-use button 84 is a button to be selected when there is no plan to use the copy function. The non-use button 84 is displayed along with a text "4. Not use the function." The unknown button 85 is a button to be selected when the user has no idea about the frequency in use of the copy function. The unknown button 85 is displayed along with a text "5. No idea."

When one of the five selectable options is tapped, a check mark is added onto a confirmation box at a left end portion of the tapped button. The check mark is allowed to be put on only a single one of the five confirmation boxes. Then, when an OK button 86 is tapped in a state where the check mark is added onto one of the confirmation boxes, a result of the questionnaire survey on the questionnaire screen 80 is stored into a memory (e.g., the NVRAM 14).

When a return button 87 is tapped on the questionnaire screen 80, the questionnaire screen 80 is switched to the last screen that had been displayed immediately before it was switched to the questionnaire screen 80. When an end button 87 is tapped on the questionnaire screen 80, the questionnaire survey is forcibly terminated.

With respect to each of the particular seven functions other than the copy function, substantially the same questionnaire screen as the questionnaire screen 80 exemplified in FIG. 5A is displayed, and a questionnaire survey on usage frequency is conducted.

Further, with respect to one or more functions of the particular eight functions, another questionnaire survey may be conducted in addition to the questionnaire survey on usage frequency. For example, in the case for the copy function, when the high frequency button 81 or the middle frequency button 82 is selected on the questionnaire screen 80 shown in FIG. 5A, a detail inquiry screen 90 is further displayed as exemplified in FIG. 5B. The detail inquiry screen 90 is a screen for inquiring of the user about a purpose of use of the copy function.

On the detail inquiry screen 90 exemplified in FIG. 5B, three buttons are displayed as selectable options for the purpose of use. Specifically, the three buttons include a "Work" button 91 to be selected when a main purpose of use of the copy function is for work, a "Hobby" button 92 to be selected when the main purpose of use of the copy function is for hobby, and an "Other" button 93 to be selected when the main purpose of use of the copy function is unknown or is not for work or hobby. When one of the three buttons 91 to 93 is tapped, a check mark is added onto a confirmation box at a left end portion of the tapped button. When an OK button 96 is tapped in a state where the check mark is added onto one of the three buttons 91 to 93, a result of an answer input on the detail inquiry screen 90 is stored into a memory (e.g., the NVRAM 14).

When a return button 97 is tapped on the detail inquiry screen 90, the detail inquiry screen 90 is switched to the questionnaire screen 80 shown in FIG. 5A. When an end button 98 is tapped on the detail inquiry screen 90, the questionnaire survey is forcibly terminated.

The result of the questionnaire survey on the usage frequency is reflected in how to display each function button on the custom standby screen 100, and the number and display order of setting items on the setting change screen 70 (see FIG. 4B).

The result of the questionnaire survey on the purpose of use is reflected in a default value for each setting value. Namely, the default value for each setting value is set to a custom value based on the result of the questionnaire survey on the purpose of use. For instance, in the questionnaire survey regarding the copy function, when the button 91 is tapped (i.e., when the user provides the answer that the main purpose of use of the copy function is for work), the default value for each setting value is set to a custom value for work that is optimized for textual document with a graph. Further, for instance, when the button 92 is tapped (i.e., when the user provides the answer that the main purpose of use of the copy function is for hobby), the default value for each setting value is set to a custom value for hobby that is optimized for photograph printing.

Before the questionnaire survey is started, a screen is displayed that provides an explanation regarding contents and purposes of the questionnaire survey and an inquiry as to whether the user has an intension to accept the questionnaire survey. When the user selects on the screen an option to provide an answer that the user has an intension to accept the questionnaire survey, the questionnaire survey is started.

(4) Custom Standby Screen

Subsequently, an explanation will be provided of the custom standby screen 100 set based on the results of the questionnaire survey with reference to FIG. 6. In the questionnaire survey on the frequency in use of a function (e.g., the copy function), when the user selects the first option "1. Use the function frequently," a priority for displaying the function button for the copy function on the custom standby screen 100 is set to "High" representing the highest priority. When the user selects the second option "2. Use the function," the priority is set to "Middle" representing the second highest priority. When the user selects the third option "3. Not use the function so frequently," the priority is set to "Low" representing the third highest priority (the second lowest priority). When the user selects the fifth option "5. No idea," the priority is set to "Lowest" representing the lowest priority. When the user selects the fourth option "4. Not use the function," the function button for the copy function is set not to be displayed on the custom standby screen 100.

Thus, the priority is set based on the result of the questionnaire survey on the frequency in use of each individual one of the particular eight functions. Then, on the custom standby screen 100, the function buttons are arranged from the left to the right in a descending order of the set priorities. When there are a plurality of functions having the same priority, the function buttons for the plurality of functions are arranged on the custom standby screen 100 in accordance with the standard arrangement order on the default standby screen 30.

FIG. 6 shows an exemplary custom standby screen 100 to be displayed based on the following results of the questionnaire survey on usage frequency. That is, the fourth option "4. Not use the function" is selected for the facsimile function and the cloud function, the first option "1. Use the function frequently" is selected for the label print function, the second option "2. Use the function" is selected for the copy function and the scanning function, and the third option "3. Not use the function so frequently" is selected for the digital camera print function.

In the aforementioned example, as the results of the questionnaire survey on usage frequency, the priority for the label print function is set to "Highest," the priorities for the copy function and the scanning function are set to "Middle," and the priority for the digital camera print function is set to "Low." The copy function and the scanning function have the same priority. Nonetheless, the copy function is arranged ahead of the scanning function in the standard arrangement order. Therefore, on the custom standby screen 100, the label print button 101, the copy button 102, the scanning button 103, and the digital camera print button 104 are arranged from the left (a leading side) to the right (a tail side) in the aforementioned order.

Further, in the aforementioned example, the fourth option "4. Not use the function" is selected for the two functions in the questionnaire survey, and the function buttons corresponding to the two functions are not displayed on the custom standby screen 100. Thus, as the results of the questionnaire survey, when even one of the function buttons is not displayed, a default switch button 105 is disposed at the end of the arrangement order. The default switch button 105 is a button having the same function as the default switch button 121 (see FIG. 7A) displayed on the menu screen 120 under custom settings. Namely, when the default switch button 105 is tapped, the custom standby screen 100 is switched to the default standby screen 30.

When the standby screen is set to the custom standby screen 100 shown in FIG. 6, what is first displayed after the displayed screen is switched to the custom standby screen 100 is the first custom standby screen 100a shown in an upper portion of FIG. 6. On the first custom standby screen 100a, the function buttons with the first to third (highest) priorities, i.e., the label print button 101, the copy button 102, and the scanning button 103 are arranged in the aforementioned order.

When the leftward scrolling button 43 is tapped on the first custom standby screen 100a, the screen is scrolled leftward in the following manner. That is, the currently-displayed three function buttons are moved leftward and disappear from the screen, and next three function buttons newly appear onto the screen from the right. Thus, the screen is changed to a second custom standby screen 100b shown in a middle portion of FIG. 6. On the second custom standby screen 100b, the digital camera print button 104 (the function button with the fourth (highest) priority) and the default switch button 105 are arranged in the aforementioned order. When the rightward scrolling button 42 is tapped on the second custom standby screen 100b, the displayed screen is switched to the first custom standby screen 100a. When the rightward scrolling button 42 is tapped on the first custom standby screen 100a, the displayed screen is switched to the second custom standby screen 100b.

When the menu button 41 is tapped on the custom standby screen 100, the displayed screen is switched to the menu screen 120 under custom settings (see FIG. 7A). It is noted that it is possible to determine, as needed, sorts and dispositions of buttons to be displayed on the menu screen 120 under custom settings.

For instance, when the default switch button 105 is displayed on the custom standby screen 100 as shown in FIG. 6, the default switch button 121 may not be displayed on the menu screen 120. Further, for instance, as exemplified in FIG. 7B, a questionnaire button 131 for conducting the questionnaire survey may be displayed on a menu screen 130. In this case, when the questionnaire button 131 is tapped, the questionnaire survey may be conducted. Further, contents displayed on the custom standby screen 100 may be updated based on the results of the questionnaire survey. The questionnaire button 131 may be displayed on the menu screen 50 under default settings (see FIG. 3). When there are seven or more buttons to be displayed, a rightward scrolling button 132 and a leftward scrolling button 133 may be displayed as exemplified in FIG. 7B, so as to make it possible to scroll the screen along the left-to-right direction.

When one of the function buttons is tapped on the custom standby screen 100, a corresponding function execution screen 60 at the first hierarchical level is displayed in the same manner as on the default standby screen 30, as described with reference to FIG. 4A. When the setting change button is tapped on the function execution screen 60, the setting change screen at the second hierarchical level is displayed, as described with reference to FIG. 4B.

When the displayed screen is switched to the setting change screen at the hierarchical level that is two-level lower than the hierarchical level of the custom standby screen 100, contents (specifically, sorts and arrangement orders of setting items) displayed on the setting change screen are updated based on the results of the questionnaire survey.

For example, the setting change screen for a function for which the first option "1. Use the function frequently" is selected is a detail screen. On the detail screen, all the setting items to be displayed are arranged in a particular order. The setting change screen for a function for which the second option "2. Use the function" is selected is a first simple screen. On the first simple screen, one or more particular setting items of all the setting items to be displayed are omitted (not displayed). The setting change screen for a function for which the third option "3. Not use the function so frequently" is selected is a second simple screen. On the second simple screen, one or more further setting items are omitted in addition to the one or more particular setting items omitted on the first simple screen. It is possible to determine as needed which setting items are to be arranged in what order on each simple screen based on the results of the questionnaire survey.

As the results of the questionnaire survey, when the fourth option "4. Not use the function" is selected for seven functions of the particular eight functions, only a single function button is to be displayed on the custom standby screen 100. In this case, according to the illustrative embodiment, the custom standby screen 100 with the single function button displayed thereon is not displayed. Instead, the function execution screen at the first hierarchical level that corresponds to the single function button is displayed (as a custom standby screen) from the beginning. Nonetheless, instead of the above example, for instance, the single function button may be displayed on the custom standby screen. Alternatively, a separately-prepared screen may be displayed, on which specific contents concerning the single function button are displayed.

(5) Questionnaire Process

Subsequently, a questionnaire process will be described with reference to FIG. 8. The questionnaire process is executed by the CPU 11 (in accordance with the questionnaire programs of the programs 12a stored in the ROM 12) after the MFP 1 is powered on and the CPU 11 is activated. It is noted that the questionnaire programs may be stored in at least one of the ROM 12 and the NVRAM 14. In the questionnaire process, the questionnaire survey is executed, and setting values are updated based on the results of the questionnaire survey. The questionnaire process shown in FIG. 8 includes partial operations extracted from operations related to execution of the questionnaire survey and updating of setting values based on the results of the questionnaire survey, particularly in the initial processes to be executed by the CPU 11.

After being activated, the CPU 11 starts the questionnaire process shown in FIG. 8, and determines whether the CPU 11 has been activated in response to the MFP 1 being powered on for the first time after being purchased (S110). When determining that the CPU 11 has not been activated in response to the MFP 1 being powered on for the first time after being purchased (S110: No), the CPU 11 goes to S180. In S180, the CPU 11 controls the LCD 21 to display a currently-set one of the default standby screen and the custom standby screen.

meanwhile, when determining that the CPU 11 has been activated in response to the MFP 1 being powered on for the first time after being purchased (S110: Yes), the CPU 11 goes to S120. In S120, the CPU 11 controls the LCD 21 to display an explanation screen. The explanation screen is a screen for providing an explanation on contents and purposes of the questionnaire survey and for inquiring of the user about whether the user is ready to accept the questionnaire survey. The explanation screen accepts thereon a user's answer to the inquiry as to whether the user accepts the questionnaire survey.

In S130, the CPU 11 determines whether the CPU 11 is allowed to start the questionnaire survey. When the user inputs, on the explanation screen, an answer that the user is not ready to accept the questionnaire survey, the CPU 11 determines that the CPU 11 is not allowed to start the questionnaire survey (S130: No), and goes to S170. In S170, the CPU 11 sets the standby screen to the default standby screen. Then, the CPU 11 goes to S180.

Meanwhile, when the user inputs, on the explanation screen, an answer that the user is ready to accept the questionnaire survey, the CPU 11 determines that the CPU 11 is allowed to start the questionnaire survey (S130: Yes), and goes to a questionnaire execution process in S140.

FIG. 9 shows a detailed procedure of the questionnaire execution process in S140. As shown in FIG. 9, in the questionnaire execution process, the CPU 11 initially sets a function variable n to one (S210). In S220, the CPU 11 determines whether the questionnaire survey is completed. Specifically, the CPU 11 determines whether the function variable n is more than the number N (in the illustrative embodiment, N=8) of the functions to which the questionnaire survey is directed. When determining that the function variable n is more than the number N of the functions (S220: Yes), the CPU 11 determines that the questionnaire survey is completely executed, and terminates the questionnaire execution process. Then, the CPU 11 goes to a questionnaire result applying process in S150 (see FIG. 8).

Meanwhile, when determining that the function variable n is equal to or less than the number N of the functions (S220: No), the CPU 11 goes to S230. In S230, the CPU 11 controls the LCD 21 to display a questionnaire screen for a function n. In the illustrative embodiment, function numbers 1 to 8 are assigned to the particular eight functions to which the questionnaire survey is directed, respectively, for the sake of convenience. For example, the facsimile function is assigned with the function number 1. The copy function is assigned with the function number 2. The scanning function is assigned with the function number 3. In this way, the particular eight functions are assigned with the function numbers 1 to 8 in accordance with the standard arrangement order. In S230, the CPU 11 controls the LCD 21 to display the questionnaire screen (see FIG. 5A) for inquiring the frequency in use of a function n (i.e., a function assigned with a function number "n") of the particular eight functions.

In S240, the CPU 11 determines whether the questionnaire screen has accepted a user's answer input thereon. When determining that the questionnaire screen has not accepted a user's answer input thereon (S240: No), the CPU 11 determines whether a time-out has occurred, i.e., whether a predetermined period of time has elapsed since the questionnaire screen begun to be displayed in S230 (S280). When determining that a time-out has not occurred (S280: No), the CPU 11 goes back to S240. Meanwhile, when determining that a time-out has occurred (S280: Yes), the CPU 11 goes to S290. In S290, the CPU 11 treats each remaining function for which any answer has not been input on the corresponding questionnaire screen, as a function for which the fifth option "5. No idea" has been selected. Further, in S290, the CPU 11 stores the results of the questionnaire survey into a memory (e.g., the NVRAM 14).

In S240, when determining that the questionnaire screen has accepted a user's answer input thereon (S240: Yes), the CPU 11 goes to S250. In S250, the CPU 11 determines whether information input on the questionnaire screen is an instruction to terminate the questionnaire survey. Specifically, when the end button (e.g., the button 88 in FIG. 5A) is tapped on the questionnaire screen, the instruction to terminate the questionnaire survey is issued. When determining that information input on the questionnaire screen is the instruction to terminate the questionnaire survey (S250: Yes), the CPU 11 goes to S290. Meanwhile, when determining that information input on the questionnaire screen is not the instruction to terminate the questionnaire survey, i.e., when the OK button is tapped after one of the five selectable options is selected (S250: No), the CPU 11 goes to S260.

In S260, the CPU 11 stores the results of the questionnaire survey on the function n into a memory (e.g., the NVRAM 14). In S270, the CPU 11 increments the function variable n by one. After S270, the CPU 11 goes back to S220, and repeatedly performs the operations in S220 and the following steps until the function variable n exceeds eight (i.e., until the questionnaire survey is executed for all of the particular eight functions). After completion of the questionnaire execution process shown in FIG. 9, the CPU 11 goes to S150 in FIG. 8.

FIG. 10 shows a detailed procedure of the questionnaire result applying process in S150. As shown in FIG. 10, in the questionnaire result applying process, the CPU 11 initially sets the function variable n to one (S310). In S320, the CPU 11 determines whether the results of the questionnaire survey on all of the particular eight functions are completely applied. Specifically, the CPU 11 determines whether the function variable n is more than the number N of the functions. When determining that the function variable n is more than the number N of the functions (S320: Yes), the CPU 11 determines that the results of the questionnaire survey on all of the particular eight functions are completely applied, and terminates the questionnaire result applying process. Then, the CPU 11 goes to S160 (see FIG. 8). When determining that the function variable n is equal to or less than the number N of the functions (S320: No), the CPU 11 goes to S330. In S330, the CPU 11 sets the result of the questionnaire survey on the function n as a processing target. It is noted that the "processing target" defined here denotes an object to be treated in determinations in S340, S360, S380, and S400.

In S340, the CPU 11 determines whether the result of the questionnaire survey on the function n is "1. Use the function frequently." When determining that the result of the questionnaire survey on the function n is "1. Use the function frequently" (S340: Yes), the CPU 11 goes to S350. In S350, the CPU 11 sets the priority (the order in the arrangement of the function buttons) for the function n on the custom standby screen to "High." Then, the CPU 11 goes to S440. Meanwhile, when determining that the result of the questionnaire survey on the function n is not "1. Use the function frequently" (S340: No), the CPU 11 goes to S360.

In S360, the CPU 11 determines whether the result of the questionnaire survey on the function n is "2. Use the function." When determining that the result of the questionnaire survey on the function n is "2. Use the function" (S360: Yes), the CPU 11 goes to S370. In S370, the CPU 11 sets the priority of the function n on the custom standby screen to "Middle." Then, the CPU 11 goes to S440. Meanwhile, when determining that the result of the questionnaire survey on the function n is not "2. Use the function" (S360: No), the CPU 11 goes to S380.

In S380, the CPU 11 determines whether the result of the questionnaire survey on the function n is "3. Not use the function so frequently." When determining that the result of the questionnaire survey on the function n is "3. Not use the function so frequently" (S380: Yes), the CPU 11 goes to S390. In S390, the CPU 11 sets the priority of the function n on the custom standby screen to "Low." Then, the CPU 11 goes to S440. Meanwhile, when determining that the result of the questionnaire survey on the function n is not "3. Not use the function so frequently" (S380: No), the CPU 11 goes to S400.

In S400, the CPU 11 determines whether the result of the questionnaire survey on the function n is "4. Not use the function." When determining that the result of the questionnaire survey on the function n is "4. Not use the function" (S400: Yes), the CPU 11 goes to S410. In S410, the CPU 11 removes the function button of the function n from a set of buttons to be displayed on the custom standby screen. In S420, the CPU 11 puts the default switch button at a tail end of the arrangement order on the custom standby screen. After S420, the CPU 11 goes to S440.

When determining that the result of the questionnaire survey on the function n is not "4. Not use the function" (S400: No), i.e., when the result of the questionnaire survey on the function n is "5. No idea," the CPU 11 goes to S430. In S430, the CPU 11 sets the priority of the function n on the custom standby screen to "Lowest." Then, the CPU 11 goes to S440.

In S440, the CPU 11 increments the function variable n by one. Then, the CPU 11 goes back to S320. Then, the CPU 11 repeatedly performs the operations in S330 and the following steps until the function variable n exceeds eight (i.e., until the results of the questionnaire survey are applied to all of the particular eight functions). After completion of the questionnaire result applying process shown in FIG. 10, the CPU 11 goes to S160 in FIG. 8. In S160, the CPU 11 sets the standby screen to the custom standby screen.

In the MFP 1 of the illustrative embodiment, the questionnaire survey is executed as one of the initial processes when the MFP 1 is powered on for the first time after being purchased, and thereafter, in general, the survey will not executed. Nonetheless, as exemplified in FIG. 7B, when the questionnaire button 131 is disposed on the menu screen, it is possible to again execute the questionnaire survey by tapping the questionnaire button 131. Further, when the questionnaire survey has not been executed in the initial processes, it is possible to execute the questionnaire survey by tapping the custom switch button 53 on the menu screen 50 under default settings (see FIG. 3).

When determining in S130 that the CPU 11 is not allowed to start the questionnaire survey (S130: No), i.e., when the user inputs, on the explanation screen, the answer that the user is not ready to accept the questionnaire survey, the CPU 11 may treat each of the particular eight functions as a function for which the first option "1. Use the function frequently" has been selected. Further, the CPU 11 may set the standby screen to a custom standby screen in which this result has been reflected. In this case, it is noted that the resulting standby screen set as a custom standby screen is substantially the same as the default standby screen.

(6) Advantageous Effects of Illustrative Embodiment

According to the illustrative embodiment, the MFP 1 (more specifically, the CPU 11) executes the questionnaire survey on the frequency in use of each of the particular eight functions of which the function buttons are displayed on the default standby screen. Further, the contents displayed on the custom standby screen are determined based on the results of the questionnaire survey. Thus, the custom standby screen is a standby screen in which the result of the questionnaire survey on the frequency in use of each function is reflected. Therefore, it is possible to display a user-friendly custom standby screen in which user-specific information on the frequency in use of each function is reflected.

The fourth option "4. Not use the function" is provided as a choice of the questionnaire survey on the frequency in use of each function. When the user selects the fourth option for a specific function, the function button of the specific function is not displayed on the custom standby screen. If the function button of a function that is not used by the user is displayed on the standby screen, the function button is unnecessary for the user. Therefore, by selecting the fourth option "4. Not use the function" for an unnecessary function, it is possible to simplify the contents displayed on the custom standby screen. Thereby, it is possible for the user to efficiently find and select an intended function on the custom standby screen.

Further, with respect to each of functions that the user intends to use, the user is allowed to select an option according to the user's the frequency in use of each function, from among the plurality of selectable options that represent respective different degrees of the frequency in use of each function. Then, the priority of the function button of the function is set in accordance with the selected degree of the frequency in use of the function. Thus, on the custom standby screen, the function buttons are arranged in a descending order of the set priorities.

Thus, as the function buttons are arranged in a descending order of the priorities, it is possible for the user to quickly and efficiently find the function button of an intended function that the user uses with high frequency. Namely, it is possible to quickly execute the intended function. In the illustrative embodiment, particularly, a display area of the LCD 21 of the MFP 1 is not so wide, and the maximum number of function buttons concurrently displayable thereon is three. Therefore, when an intended function button is not displayed on the LCD 21, the user needs to search for the intended function button while scrolling the screen along the left-to-right direction. However, in the illustrative embodiment, it is possible to place the function button of a frequently-used function in a position close to a leading end of the arrangement order. Then, at least three function buttons of functions that are used with relatively high frequency are first displayed after the displayed screen is switched to the custom standby screen. Hence, according to aspects of the present disclosure, the less the number of concurrently-displayable function buttons (function images) is, the higher the achieved effect is.

In the MFP 1 of the illustrative embodiment, after the user answers the questionnaire survey, the standby screen is set to the custom standby screen. Nonetheless, it is possible to change the custom standby screen to the default standby screen. Conversely, it is possible to change the default standby screen to the custom standby screen.

Therefore, for instance, when the user wants to use a function un-selectable on the custom standby screen after the standby screen has been set to the custom standby screen, the user is allowed to change the custom standby screen to the default standby screen and select the function on the default standby screen.

Further, when the fourth option "4. No use the function" is selected for all but a specific one of the eight functions, the function execution screen at the first hierarchical level that corresponds to the function button of the specific function is displayed as a custom standby screen from the beginning. Therefore, when having only a single function that the user intends to use, the user is allowed to cause the MFP 1 (the LCD 21) to display the function execution screen for the single function as a standby screen from the beginning, by providing such answers to the questionnaire survey as to indicate that the user has only a single function that the user intends to use. Thereby, it is possible to save a troublesome operation of selecting the function button of the single function on the standby screen. Further, it is possible to quickly use the single function.

The questionnaire survey is executed as one of the initial processes to be executed when the MFP 1 is powered on for the first time after being purchased. Therefore, the user is allowed to cause the MFP 1 (the LCD 21) to display a custom standby screen according to user's preference from a point of time when the user begins to use the MFP 1. Further, the initial introduction purge is executed in parallel with initial processes including the questionnaire survey. In other words, the MFP 1 is configured to perform the initial processes in parallel while executing the initial introduction purge.

The questionnaire survey is not only executed as one of the initial processes but also may be executed in response to a user's request. Specifically, in the illustrative embodiment, it is possible to execute the questionnaire survey by tapping the questionnaire button on the menu screen. Therefore, for instance, when the user wants to change the current contents displayed on the custom standby screen, the user is allowed to update the contents displayed on the custom standby screen by tapping the questionnaire button. Further, for instance, in the case where the user provides an answer that the user does not accept the questionnaire survey during execution of the initial processes, and thereby the custom standby screen is not generated, when the user wants to generate the custom standby screen, the user is allowed to generate the custom standby screen by tapping the questionnaire button.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modification

In the case where there is a function for which the fifth option "5. No idea" has been selected in the questionnaire survey, when the function button of the function is tapped on the custom standby screen, the questionnaire survey may be re-executed to inquire the frequency in use of the function and the purpose of use of the function. Further, in this case, the contents displayed on the custom standby screen may be updated based on results of the re-executed questionnaire survey.

In the case where there is a function for which the fourth option "4. Not use the function" has been selected in the questionnaire survey, a specific button for changing a display state of the function button of the function may be displayed on the custom standby screen. Namely, when the specific button is tapped on the custom standby screen, the function button of the function may be brought into a displayed state from a non-displayed state.

Various settings regarding the questionnaire survey may appropriately be determined and updated as needed. The various settings regarding the questionnaire survey may include settings about what kinds of inquiries are to be made in the questionnaire survey, how many and what kinds of options are to be provided as selectable answers in the questionnaire survey, and how the custom standby screen and the menu screen are to be configured based on the results of the questionnaire survey.

Further, the various settings regarding the questionnaire survey, which may appropriately be determined and updated as needed, may include settings about up to what screen the results of the questionnaire survey are to be reflected. For example, settings about in which function the results of the questionnaire survey are to be reflected may appropriately be determined and updated as needed. Further, for instance, settings about up to a screen at which hierarchical level the results of the questionnaire survey are to be reflected may appropriately be determined and updated as needed. Namely, regardless of the sort and the hierarchical level of the screen, various kinds of information may be received in the questionnaire survey, such as user-specific information on the frequency in use of a function, the purpose of use of the function, user's habits when using the function, and user's preference. Further, various sorts of screens, in which the received user-specific information is reflected, may be displayed.

The questionnaire survey is not necessarily required to be executed by displaying inquiries on the LCD 21. The inquiries may be made in other methods. For example, the inquiries may be made by voice guidance. The method for providing user's answers to the inquiries is not limited to tapping on the touchscreen 22 but may be other methods. For example, the user's answers may be input into the MFP 1 as voices emitted from the user. In this case, the user's voices may be processed by voice recognition processing to identify the user's answers.

In the aforementioned illustrative embodiment and modifications, exemplary methods for customizing the standby screen have been described. Specifically, the exemplary methods are adapted to execute the questionnaire survey on the user's frequency in use of each function and the user's purpose of use of each function, and to determine which function buttons are to be displayed and determine the arrangement order of the function buttons to be displayed. Nonetheless, the customization of the standby screen may be performed in other methods. Further, an object to which such customization is directed is not limited to the standby screen. Such customization may be applied to other screens such as screens at lower hierarchical levels.

For example, the MFP 1 may be configured to determine IT literacy of the user and display screens conforming to the IT literacy. It is noted that the IT literacy means an ability to use and manage information technologies.

There are various possible methods for determining the IT literacy of the user. For instance, the IT literacy of the user may be determined based on how long the user has taken to input necessary information in the initial processes, how many mistaken operations the user has performed in the initial processes, and how many times the user has pressed a help button in the initial processes. The longer the period of time taken for inputting necessary information in the initial processes is, the lower the IT literacy is. The less the number of mistaken operations in the initial processes is, the higher the IT literacy is. The more the number of times the user has pressed the help button in the initial processes is, the lower the IT literacy is.

For instance, when determining that the IT literacy of the user is low, the MFP 1 (the CPU 11) may display on the standby screen only a limited number of function buttons corresponding to some basic functions. In this case, for instance, the MFP 1 (the CPU 11) may display a default switch button, and may switch the standby screen to a standard default standby screen in response to the default switch button being tapped.

What is claimed is:

1. A function execution apparatus comprising:
   an input unit;
   a display configured to display a standby screen for displaying function images arranged thereon, the function images representing a plurality of functions executable by the function execution apparatus, respectively; and
   a controller configured to:
      control the display to display at least one inquiry screen, each inquiry screen including a plurality of selectable objects for an individual function of the plurality of functions;
      while each inquiry screen is being displayed, receive, via the input unit, a user input to select one of the plurality of selectable objects for the respective individual function of the plurality of functions;
      determine whether to remove the function image of each individual function from the standby screen, based on the selected object for each of the plurality of functions;
      set the standby screen to a first screen from which a function image determined to be removed is removed, the first screen being configured to display thereon one or more function images determined not to be removed, the one or more function images being arranged based on the selected object for each of the plurality of functions; and
      in response to setting the standby screen to the first screen, control the display to display the first screen as the standby screen.

2. The function execution apparatus according to claim 1, wherein the controller is configured to make an inquiry via the inquiry screen as to whether each individual function is used, on a function-by-function basis.

3. The function execution apparatus according to claim 1, wherein the controller is further configured to set a priority for each individual function of the plurality of functions, based on the selected one of the plurality of selectable objects for each of the plurality of functions, and
   wherein the first screen is configured to display thereon the function images arranged in a descending order of the set priorities.

4. The function execution apparatus according to claim 1, wherein the first screen is configured to restrict display of a function image of a specific function of the plurality of functions when the selected one of the plurality of selectable objects for that specific function includes information representing that the specific function is not used.

5. The function execution apparatus according to claim 1, wherein the controller is further configured to:
receive a standardizing instruction to display on the display a second screen configured to display thereon the function images arranged in a standard arrangement order;
in response to receiving the standardizing instruction, set the standby screen to the second screen; and
in response to setting the standby screen to the second screen, control the display to display the second screen as the standby screen.

6. The function execution apparatus according to claim 5, wherein the controller is further configured to:
receive a switching instruction to switch the standby screen from the second screen to the first screen;
in response to receiving the switching instruction, switch settings for the standby screen from the second screen to the first screen; and
in response to switching the settings for the standby screen from the second screen to the first screen, control the display to display the first screen.

7. The function execution apparatus according to claim 1, wherein the controller is further configured to, in response to a function image being selected from among the function images displayed on the standby screen, perform:
executing a function execution process to execute a specific function corresponding to the selected function image; and
controlling the display to display a function execution screen corresponding to the specific function of the selected function image.

8. The function execution apparatus according to claim 1, wherein the controller is further configured to, in response to determining that the selected one of the plurality of selectable objects for a specific function of the plurality of functions represents that the specific function of the plurality of functions is only used, control the display to display a function execution screen corresponding to the specific function as the first screen.

9. The function execution apparatus according to claim 1, wherein the controller comprises:
a processor; and
a memory storing a processor-executable instructions configured to, when executed by the processor, cause the processor to:
control the display to display the inquiry screen;
receive the user input via the input unit;
set the standby screen to the first screen as the standby screen; and
control the display to display the first screen as the standby screen in response to setting the standby screen to the first screen.

10. The function execution apparatus according to claim 1, wherein the controller is configured to:
execute an inquiry process to make an inquiry to a user about frequency in use of each individual function of the plurality of functions via the respective inquiry screen associated with each individual function, the plurality of selectable objects included in the respective inquiry screen representing respective different frequency levels in use of each individual function; and
while each inquiry screen is being displayed, receive, via the input unit, usage frequency information about the frequency in use of the respective individual function of the plurality of functions as a reply to the inquiry, the usage frequency information including a specific frequency level represented by the selected one of the plurality of selectable objects for each respective individual function of the plurality of functions,
wherein the one or more function images determined not to be removed are arranged based on the received usage frequency information.

11. The function execution apparatus according to claim 10,
wherein the controller is configured to execute initial processes when the function execution apparatus is powered on and starts being used for the first time, and
wherein the inquiry process is included in the initial processes.

12. The function execution apparatus according to claim 10,
wherein the controller is further configured to
receive a request for the inquiry process; and
execute the inquiry process in response to receiving the request for the inquiry process.

13. A method adapted to be implemented on a processor coupled with an input unit and a display, the display being configured to display a standby screen for displaying function images arranged thereon, the function images representing a plurality of functions executable by the processor, respectively, the method comprising:
controlling the display to display at least one inquiry screen, each inquiry screen including a plurality of selectable objects for an individual function of the plurality of functions;
while each inquiry screen is being displayed, receiving, via the input unit, a user input to select one of the plurality of selectable objects for the respective individual function of the plurality of functions;
determining whether to remove the function image of each individual function from the standby screen, based on the selected object for each of the plurality of functions;
setting the standby screen to a first screen from which a function image determined to be removed is removed, the first screen being configured to display thereon one or more function images determined not to be removed, the one or more function images being arranged based on the selected object for each of the plurality of functions; and
in response to the standby screen being set to the first screen, displaying on the display the first screen as the standby screen.

14. The method according to claim 13, the method further comprising:
executing an inquiry process to make an inquiry to a user about frequency in use of each individual function of the plurality of functions via the respective inquiry screen associated with each individual function, the plurality of selectable objects included in the respective inquiry screen representing respective different frequency levels in use of each individual function; and
while each inquiry screen is being displayed, receiving, via the input unit, usage frequency information about the frequency in use of the respective individual function of the plurality of functions as a reply to the inquiry, the usage frequency information including a specific frequency level represented by the selected one of the plurality of selectable objects for each respective individual function of the plurality of functions, wherein the one or more function images determined not to be removed are arranged based on the received usage frequency information.

15. A non-transitory computer-readable medium storing computer-readable instructions that are executable by a processor coupled with an input unit and a display, the display being configured to display a standby screen for displaying function images arranged thereon, the function images representing a plurality of functions executable by the processor, respectively, the instructions being configured to, when executed by the processor, cause the processor to:

control the display to display at least one inquiry screen, each inquiry screen including a plurality of selectable objects for an individual function of the plurality of functions;

while each inquiry screen is being displayed, receive, via the input unit, a user input to select one of the plurality of selectable objects for the respective individual function of the plurality of functions;

determine whether to remove the function image of each individual function from the standby screen, based on the selected object for each of the plurality of functions;

set the standby screen to a first screen from which a function image determined to be removed is removed, the first screen being configured to display thereon one or more function images determined not to be removed, the one or more function images being arranged based on the selected object for each of the plurality of functions; and in response to setting the standby screen to the first screen, control the display to display the first screen as the standby screen.

16. The non-transitory computer-readable medium according to claim 15, wherein the instructions are configured to further cause the processor to:

execute an inquiry process to make an inquiry to a user about frequency in use of each individual function of the plurality of functions via the respective inquiry screen associated with each individual function, the plurality of selectable objects included in the respective inquiry screen representing respective different frequency levels in use of each individual function; and while each inquiry screen is being displayed, receive, via the input unit, usage frequency information about the frequency in use of the respective individual function of the plurality of functions as a reply to the inquiry, the usage frequency information including a specific frequency level represented by the selected one of the plurality of selectable objects for each respective individual function of the plurality of functions, wherein the one or more function images determined not to be removed are arranged based on the received usage frequency information.

* * * * *